US007599765B2

(12) United States Patent
Padan

(10) Patent No.: US 7,599,765 B2
(45) Date of Patent: Oct. 6, 2009

(54) DYNAMIC GUIDANCE FOR CLOSE-IN MANEUVERING AIR COMBAT

(75) Inventor: Nir Padan, Moshav Sade, Yitzhak (IL) 38840

(73) Assignee: Nir Padan, Moshav Sade Itzhak (IL)

( * ) Notice: Subject to any disclaimer, the term of this patent is extended or adjusted under 35 U.S.C. 154(b) by 501 days.

(21) Appl. No.: 10/537,475

(22) PCT Filed: Jun. 11, 2003

(86) PCT No.: PCT/IL03/00494

§ 371 (c)(1), (2), (4) Date: Oct. 24, 2005

(87) PCT Pub. No.: WO2004/051485

PCT Pub. Date: Jun. 17, 2004

(65) Prior Publication Data

US 2006/0142903 A1 Jun. 29, 2006

(30) Foreign Application Priority Data

Dec. 5, 2002 (IL) ..................................... 153291

(51) Int. Cl.
*G09B 9/08* (2006.01)

(52) U.S. Cl. ............................................... 701/3; 703/2

(58) Field of Classification Search ..................... 701/3; 463/31, 54; 703/2, 6–8; 273/441, 442; 434/14, 434/30–40

See application file for complete search history.

(56) References Cited

U.S. PATENT DOCUMENTS

| | | | | |
|---|---|---|---|---|
| 5,308,022 A * | 5/1994 | Cronkhite et al. | .......... | 244/3.14 |
| 5,587,904 A * | 12/1996 | Ben-Yair et al. | ............ | 701/213 |
| 5,807,109 A * | 9/1998 | Tzidon et al. | ................. | 434/35 |
| 6,012,676 A * | 1/2000 | Gold et al. | ............... | 244/17.13 |
| 6,703,945 B2 * | 3/2004 | Kuntman et al. | ............ | 340/961 |
| 6,739,556 B1 * | 5/2004 | Langston | .................... | 244/189 |
| 6,763,325 B1 * | 7/2004 | Stone | ............................ | 703/8 |
| 2004/0007121 A1 | 1/2004 | Graves et al. | | |

OTHER PUBLICATIONS

International Search Report dated Mar. 31, 2004 from PCT/IL2003/000494.

* cited by examiner

*Primary Examiner*—Dalena Tran

(57) ABSTRACT

A system, apparatus and method for optimizing the conduct of a close-in air combat are disclosed. A computing device is operative in the analysis of a close-in air combat situation. The computing device stores and utilizes one or more aerial aircraft-specific, weapon systems-specific and close-in air combat-situation-specific information. The computing device is operative in the analysis of the current air combat situation (12) and in the generation of a flight control recommendation (40). Consequently, the recommendation is converted into an indication having visual or audio format to be communicated to the operating crew of the aerial vehicle. The recommendation could further to be converted into specific flight control/energy commands and to be introduced directly to the control systems of the aircraft.

30 Claims, 6 Drawing Sheets

DYNAMIC GUIDANCE FOR CLOSE-IN MANEUVERING AIR COMBAT

BACKGROUND OF THE INVENTION

1. Field of Invention

The present invention relates to a novel system and method for performing accurate real-time situation assessments and for providing dynamic guidance to the operating crew of an aerial manned or unmanned vehicle to enhance the performance of the crew during the participation of the vehicle in a close-in maneuvering air combat.

2. Discussion of the Related Art

A fighter aircraft is a weapon system-bearing aerial platform, maneuverable in three dimensions (six degrees of freedom), the functionality of which is to seek out, engage and destroy hostile targets. An onboard operating crew, such as a fighter pilot, typically controls the aircraft and the associated weapon systems interactively in real-time. A common type of operational activity a fighter aircraft is typically tasked to is an air-to-air combat (AA), which is carried out in order to challenge one or more adversary aircraft having similar maneuvering capabilities, similar weapon system-bearing options and controlled in a substantially similar manner by an adversary operating crew. The AA can also include an engagement between aircrafts having different capabilities and different weapons. A subset of AA is the close-in combat or Within Visual Range (WVR) combat, colloquially referred to as a dogfight (DGFT), which is considered to be the most difficult type of air warfare activity to conduct.

The objective of the pilot during a close-in combat is to maneuver the aircraft within the combat space such as to attain angular/energy advantage in respect to the adversary aircraft and thereby reach an attack position wherefrom an effective weapon system-based threat could be actualized. During a finite time window, the length of which depends upon various operational factors, the aircraft is directed such that ideally a gradual build-up of tactical advantage in respect to the adversary aircraft is achieved until an optimal attack position is reached.

In the early periods of air warfare a close-in combat typically involved the exclusive utilization of gun systems where the pilot used primitive aiming methods while having no capability of performing formal firing calculations. It was soon realized that under these operational constraints in order to be effective an attacking aircraft had to be maneuvered into a position close to and in the rear hemisphere of an adversary aircraft within a considerably limited firing sector wherein one or more accurately timed firing sequences of the guns could be carried out.

Continuous improvements in aerial weapon systems including the introduction of all-aspect-guided missiles, the substantial enhancement of the effective lethal weapon range envelopes, and the improved accuracy of the gun systems provided the option of firing the guns and launching the missiles against an adversary aircraft in enhanced traverse angles and within increased ranges. Consequently, it was commonly estimated that the need for traditional intense maneuvering for the positioning the attacking aircraft to the aft firing sector in respect to and into close ranges to an adversary aircraft would be substantially negated.

In response to the usage of guided missiles efficient counter measures were introduced to reduce the missile attack threat. The use of increasingly effective counter measures reduced the overall efficiency of the guided weapon systems operating in enhanced ranges and at high angular traverses and necessitated under some circumstances the appropriate maneuvering of the attacking aircraft in the traditional manner such as to position the aircraft into a close range in the rear hemisphere in respect to the adversary aircraft. Thus, the reduction of the guided weapons threat by the use of the defensive counter measures maintains the importance of a superior maneuvering capability in order to attain tactical advantage in the combat space.

The conduct of close-in maneuvering air combat is a skill-based activity, which requires that the practitioner of the combat, such as a fighter pilot, possess a set of preferred physiological characteristics (superior eyesight, fast reflexes, G-tolerance and the like). Extensive theoretical knowledge concerning aerial fighting in general, various aerial aircrafts performance and maneuverability characteristics and aerial weapon systems characteristics in particular, sufficient practical competence and suitable operational skills are also required. The core skills include the ability of the pilot to perform continuously and effectively a sequence of operational steps such as: to observe the dynamically changing situation in the combat space to evaluate the current situation accurately (specifically adversary air speed and altitude); to assess the distances between participating aircraft; to predict future potential situations; to derive correct conclusions based on the evaluations and to translate the derived conclusions into maneuver or energy commands to be input into the control systems of the aircraft in order to achieve an optimal maneuvering of the aircraft in respect to the adversary pilot and thereby to achieve an advantageous attack geometry in respect to the adversary aircraft.

The optimal conduct of a close-in combat involves a great number of variables that are associated with a plurality of input parameters, which can result in a multitude of possible potential outcomes. There are considerable and frequent variations regarding the best manner for performance of a close-in combat during a distinct engagement or across different engagements since the optimal manner of conducting the combat depends on a plurality of operational factors, such as for example the lethal weapon range envelope of the participating aircraft, the availability or non-availability of defensive means against IR-guided missiles, the external configuration of the aircraft, the rate of fuel consumption and the like. In general, the pilot engaged in a dogfight will attempt to position his aircraft to acquire an angular advantage vis-à-vis the opponent's aircraft, in such a manner as would allow the pilot to threaten the opponent's aircraft with the available weapons at his disposal. The opponent pilot will attempt to reach like position. Because some countermeasures would "blind" some aircraft's weapons systems, such as the long distance missiles, the ability to out-maneuver and reach the rear and near region of the opponent's aircraft is still of great significance. The present invention will overcome the prior art by providing a new and novel system method achieve such position by automatically assessing the situation and providing automatic or recommended guidance to the pilot, or the unmanned aerial platform.

It would be easily understood by one with ordinary skill in the art that a novel system and method is needed for optimizing the tactical performance of an aircrew in an air combat in general and specifically in a close-in combat. The system and method would preferably involve the neutralization of those human factors that negatively effect the performance of the pilot by providing a computer-based close-in air combat situation assessment and information analysis in real time that would optimize human interaction with the aerial aircraft and would enhance human performance by the provision of optimal guidance concerning aerial vehicle handling.

SUMMARY OF THE PRESENT INVENTION

One aspect of the present invention regards a system in an aerial combat engagement environment for optimizing the performance of an operating crew of at least one aerial vehicle during at least one aerial engagement by providing a real-time accurate automatic situation assessment data and by generating dynamically at least one maneuver or energy instruction and by communicating the at least one maneuver or energy instruction as maneuver or energy guidance to the operating crew of the at least one aerial vehicle. The system comprises the elements of: an assessment information database implemented on at least one on-board computer installed on the at least one aerial vehicle; and an assessment and guidance software application implemented on at least one on-board computer installed on the at least one aerial vehicle.

A second aspect of the present invention regards a system in a virtual aerial combat environment for optimizing the performance of an operator of at least one virtual aerial vehicle during at least one virtual aerial engagement by providing accurate automatic situation assessment data and by generating dynamically at least one maneuver or energy instruction and by communicating the at least one maneuver or energy instruction as maneuver or energy guidance to the operator of the at least one virtual aerial vehicle. The system comprising the elements of: an assessment information installed within at least one air-combat simulating software environment associated with the at least one virtual aerial vehicle; and an assessment and guidance software application installed within at least one air combat simulation software environment associated with at least one virtual aerial vehicle.

A third aspect of the present invention regards a method in an aerial combat engagement environment for optimizing the performance of an operating crew of at least one aerial vehicle during at least one aerial engagement by providing in real-time accurate automatic situation assessment data and by generating dynamically at least one maneuver or energy instruction and by communicating the at least one maneuver or energy instruction as maneuver or energy guidance to the operating crew of the at least one aerial vehicle. The method comprising the steps of: obtaining air combat engagement and energy formulas required for the analysis of the current and potential air combat situation existing and potentially developing between at least two aerial aircrafts; obtaining host aircraft and adversary aircraft maneuver or energy characteristics information required for the analysis of the currently existing and potentially developing air combat situation between the at last two aerial vehicles; obtaining at least one host aircraft weapon system and at least one adversary aircraft weapon system characteristics information; collecting sensor-specific information to enable analysis of the current close-in combat geometry/energy situation existing between the at least two aerial vehicles; analyzing the existing geometry/energy situation between the at least two aerial vehicles and mapping the analyzed situation in relation to the previously analyzed geometry/energy situations between the at least two aerial vehicles; generating at least one future potential air combat geometry/energy situation based on the at least one mapped current air combat geometry/energy situation; determining at least one optimal future geometry/energy state of the at least one aerial vehicle based on the at least one optimal future potential air combat geometry/energy situation between the at least two aerial vehicles; generating at least one maneuver or energy command based on the at least one optimal future potential air combat maneuver or energy situation between the at least two aerial vehicles; transforming the at least one maneuver or energy command into at least one guidance indicators; and displaying the at least one guidance indicator to the operating crew of the at last one aerial vehicle to enable the application of the associated maneuver or energy commands to the controls of the aerial vehicle.

A fourth aspect of the present invention regards an apparatus for optimizing the performance of an operating crew of at least one aerial vehicle during at least one close-in air combat by providing in real-time automatic situation assessment, the apparatus comprising a device for obtaining air combat engagement and energy information required for the analysis of the air combat situation, for obtaining aircraft characteristics information required for the analysis of the air combat situation, for obtaining aircraft weapon system characteristics information, and for obtaining remotely sensor-specific information; an analysis device for analyzing the situation between the at least two aerial vehicles and mapping the analyzed situation in relation to the previously analyzed situations between at least two aerial vehicles, for generating at least one future potential air combat situation based on the at least one mapped air combat situation, and based on the analysis determine at least one optimal state of the at least one aerial vehicle based on the at least one optimal air combat situation between the at least two aerial vehicles; and for generating at least one recommendation based on the at least one optimal future potential air combat situation between the at least two aerial vehicles. The apparatus further comprises a transforming device for transforming the at least one recommendation into at least one guidance indicator; and a display device for displaying the at least one guidance indicator to the operating crew of the at last one aerial vehicle to enable the application of the associated commands to the controls of the aerial vehicle. The apparatus further comprises a transforming device for transforming the at least one recommendation into at least one direct input commands to be automatically applied to the suitable controls of the at last one aerial vehicle.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMNT

Figure 1:
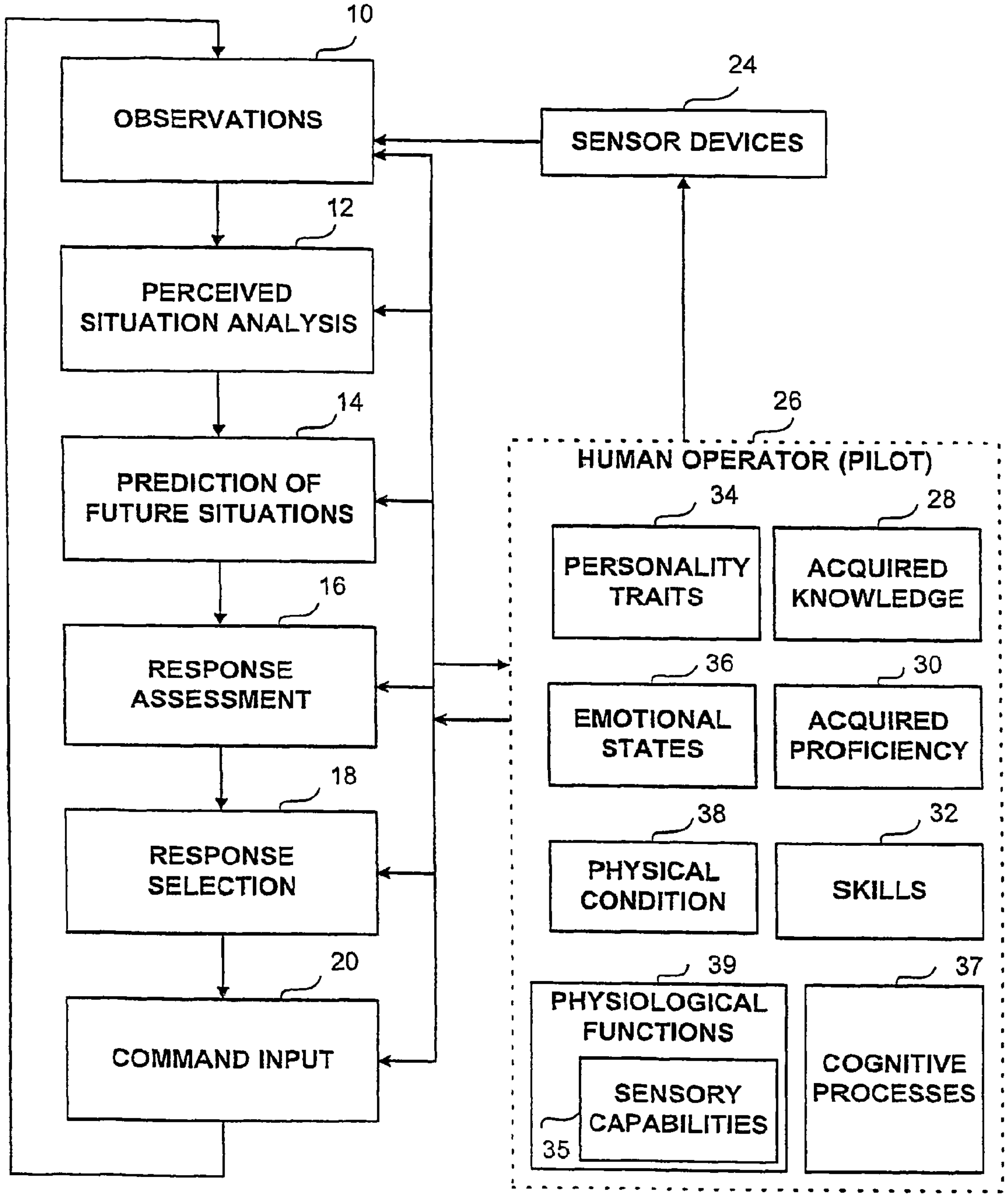
PRIOR ART FIG. 1
FIG. 1 is a simplified flowchart describing the sequence of steps required for the selection of flight control commands during the conduct of a close-in air combat, as known in the art.

A computer-based system, apparatus and method for real-time situation assessment and aerial vehicle guidance during a close-in air combat are disclosed. The system includes software and hardware components installed on aerial vehicles and at the same time or alternatively in ground-based command and control stations. The objective of the system and method is to provide a computerized method for the observation, integration, analysis, and comparison of aerial vehicles characteristics, such as energy, maneuver, and weapon system envelopes, participating in an air combat, and to process the resulting data in order to provide dynamically changing successive real-time guidance for a pilot of the aircraft or to input successive control commands to the flight controls of a manned or unmanned aircraft. In one variant present invention will evaluate in real-time the positioning of aircraft in a dog fight while assessing each aircraft's platform, performance, limitations and relevant weapons system, and suggesting the best course of action to the pilot. In a second variant, the best course of action may be determined also on the basis of existing knowledge embedded within the databases of the system of the present invention relying on previous experience accumulated by air forces around the world and known tactics for behavior during a dog fight. In addition, the assessment will be based on algorithms embedded within the software of the system of the present invention. A third variant may utilize a substantially combined method of the first and second variant.

The present system includes an assessment information database, which contains aircraft performance data, optimal maneuvering formulas and external information received via data links and stored dynamically. The aircraft performance data includes the flight envelope, the maneuver-energy graphs and the weapon systems characteristics of the aircraft. The optimal maneuvering formulas are specific algorithms corresponding to the physical/mathematical formulas operative for the optimal relative offensive/defensive maneuvering during a close-in combat. The external information, which is delivered through appropriate communications channels such as a Data Link, includes current-combat-situation-specific data collected by external and internal (e.g. fuel gage) sensors, stored on external data storage devices and/or processed by external systems.

The required aircraft maneuver for each specific aircraft and the relative attack/defense geometry (mutual dynamic spatial references generated between two aircraft as a result of both aircrafts maneuvering in diverse planes of reference in order to accumulate angular advantage in respect to the other) is pre-defined. Practically all the maneuver or energy aspects of an close-in combat is suitably derived by the automatic collection, collation, integration and processing of data representing close-in-combat-specific, aircraft-specific and weapon-specific information by the application of the appropriate set of physical/mathematical calculations.

Where the complete and timely execution of the required calculations (sufficiently in advance on the axis of time to the required maneuvers) is not realistic due to, for example, practical limitations concerning available computing power (complexity of calculations versus processor speed constrains, data storage constrains, and the like), the set of successive guidance indicators could be optionally replaced by one or more specific guidance commands that are appropriate to the identified combat situation. The specific guidance directive could be selected and extracted out from a set of well-known directives that will be stored in an appropriate format within the onboard computing device. For example, such directives could include general commands, such as "do not increase airspeed above stabilizing speed", "do not drop the nose where both aircraft are high and slow", and the like.

The present invention is implemented in association with high-speed computer processors as well as high-speed and high-bandwidth data links or any other data communications system, such as satellite radio, in order to provide the practical tools for the real-time implementation of the new method and system. A suit of logically interconnected computer programs operates the processing of the data.

The present invention provides a system and method for analyzing the movement and maneuvering as well as the abilities of airplanes participating in a dogfight, comparing between the various aircraft and providing continuous recommendations for actions for the aircraft participating. The system and method can be practiced in association with real-time dogfight as well as practice drills and simulators of all kinds. Real-time availability of the current combat data will enable the system and method of the present invention to provide an accurate recommendation and assist one pilot to overcome his opponent or to properly provide an accurate recommendation under the circumstances. A data link system, which obtains and possesses information about the participating aircrafts, enables the collection and sampling of information from the participating aircrafts. The system includes a database device for storage of relevant information about the participating aircraft. Such information will include vectors and speeds, aircraft identification and abilities, aircraft available weapons devices and the like.

The data may be received and automatically processed and used or stored for later use in the database. The system and method also includes a software device for analyzing in real time the data received or stored in the database. The software device will analyze the information and provide optimal solutions for the recommended flight path or action. Specific portions of the data could be integrated within the software routines of the system as built-in tables. The myriad uses of such a software device will be surely appreciated by those skilled in the art.

The system and method of the present invention is provided with information about the surrounding environment and aircrafts by a system called DATA LINK. DATA LINK is an inter-aircraft communication network that provides for the one-way or two-way transmission/reception of appropriately sampled data from on-board/off-board information sources, such as computers, sensors, and the like, between aircraft or between aircraft and ground stations. Typically for the performance of training flights the data link is consensual and provides the necessary information in a pre-defined and ready manner. In "live" close-in combat the information concerning the adversary aircraft or weapon systems should be obtained and integrated into the network by utilizing a set of local/remote sophisticated sensing and computing means for the location and identification of the hostile aircraft.

FIG. 1 shows a simplified flowchart describing a sequence of operative steps required for the generation of a set of successive aircraft maneuver or energy control commands during the conduct of a close-in-combat, as known in the art. The suitable input command parameters are typically determined by a human pilot 26 on board of an aerial aircraft, such as a fighter aircraft, consequent to the performance of appropriate decision-making cognitive mental process driven by input from physiological sensory sub-systems, such as the human vision, and fed by relevant information from previously acquired internal mental knowledge structures, such as information concerning air combat in general, and specific information regarding the performance and maneuvering characteristics of aerial aircrafts and aerial weapon systems. At step 10 the physical characteristics of the objects (own aircraft, one or more friendly aircrafts, one or more adversary aircrafts) relevant to the conduct of the air combat in the combat space are observed successively and continuously. The observations 10 are performed by a human pilot 26 by utilizing natural physiological functions 39, such as human vision capability 35 and associated human cognitive mental processes 37 that utilize information from previously acquired mental knowledge structures 28, 30, 32. In the performance of step 10 the human pilot 26 typically supported by relevant information collected by various external artificial sensor devices, such as sensor devices 24 that are communicated to the pilot 26 via suitable visual display or audio devices. The sensor devices 24 could include a range finding device, an altimeter, an airspeed indicator, GPS, various inertial sensors and the like.

Still referring to FIG. 1 the information collected by the sensor devices 24 is either communicated to the pilot 26 or processed by an onboard computing device (not shown). At step 12 the visual information of the air combat space perceived by the pilot's vision and associated mental mechanisms, the information supplied by the sensor devices and information obtained from internal knowledge structures triggers further mental processes of the pilot 26 that are operative in the integration and the analysis of the information. The analysis results in the perception and understanding of the current air combat situation in the combat space. Based on the results of the perceived situational analysis 12 at step 14 the pilot 26 attempts to project a predictive set of future potential combat situations. At step 16 the pilot 26 evaluates the set of projected potential situations in order to assess a set of possible responses. At step 18 after further mental cognitive processing the pilot 26 selects an optimal response. At step 20 the selected response is translated into a functional flight command that is used as input to the maneuver or energy controls of the own aircraft. The consequent movements of the aerodynamic control surfaces and the changes in the engine output are functional in the modification of the air combat situation and further used as positive or negative feedback to the pilot 26. The steps 10 through 20 are iteratively performed in extremely short time intervals until the conclusion of the aerial engagement.

Figure 2:
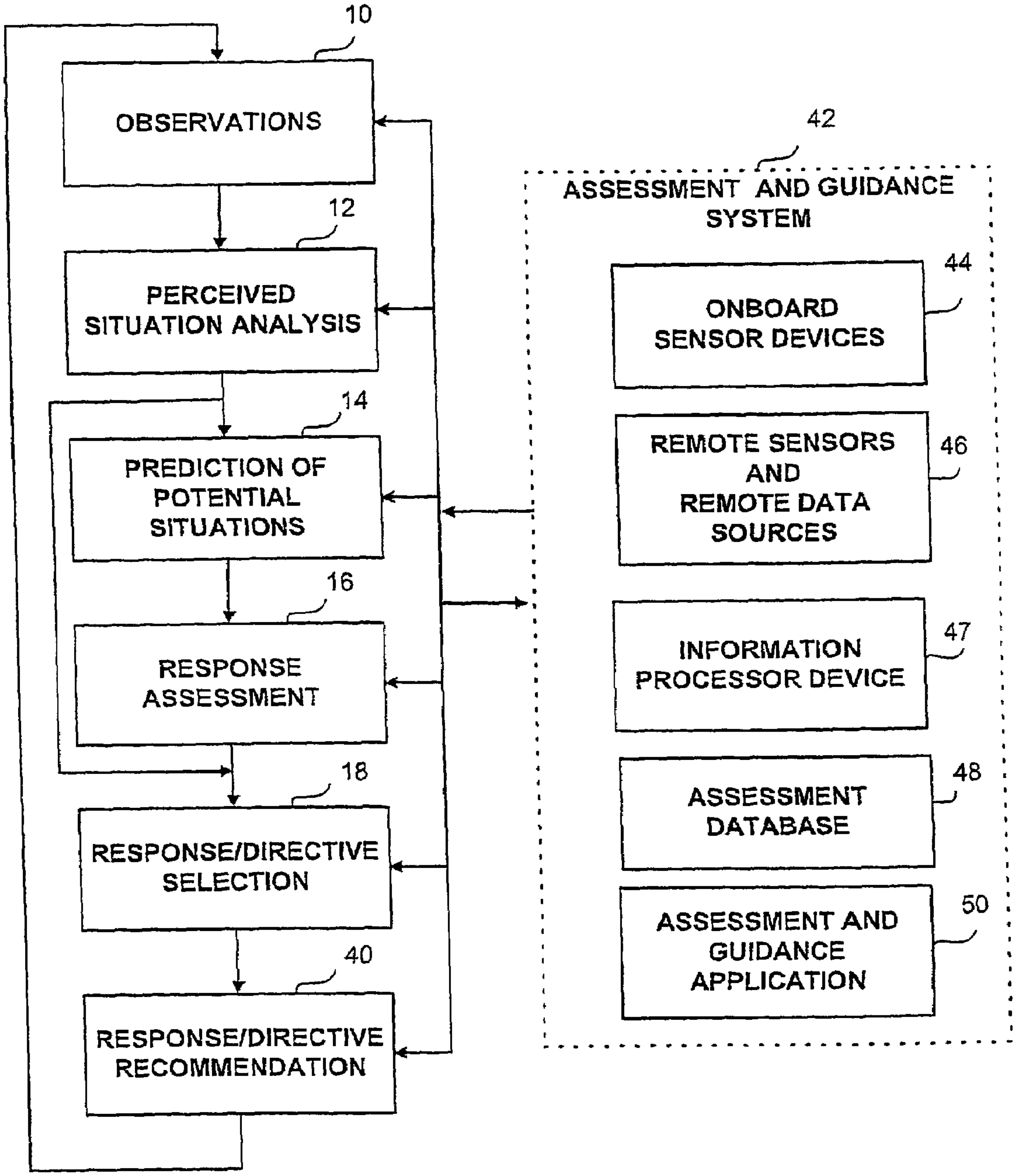
FIG. 2 is a simplified flowchart describing the sequence of steps required for the selection of a flight control commands during the conduct of a close-in air combat, in accordance with a preferred embodiment of the present invention.

FIG. 2 shows a simplified flowchart describing a sequence of operative steps required for the generation of a set of successive aircraft maneuver or energy control commands during the conduct of a close-in-combat in accordance with a preferred embodiment of the present invention. A suitable set of successive controls and engine changes output guidance are generated by an onboard assessment and guidance system 42, which is suitably installed on a computer aircraft, which may be installed on an aerial vehicle, such as a fighter aircraft. It may be alternatively installed on any other computer. The system 42 includes a machine-readable assessment information database 48 (including aircraft performance tables/charts and information supplied by the manufacturer or derived form suitable flight testing procedures) and a machine-executable assessment and guidance software application 50 both associated with an onboard information processor device 47. The system may also include a set of onboard sensors 44 and one or more remote data sources 46. The information processor device 47 or a separate computer device may control output and input of the sensor data. A computer device may be used to feed the sensors or may directly provide information to the guidance software application 50 or to the database 58. The directions created by the assessment and guidance system 42 are communicated to the pilot of the aircraft in a visual, audio, or other format, as recommendations for the input of specific control commands to the maneuver or energy controls of the aircraft. The directions could be also used as direct maneuver or energy commands to be applied in a suitably automatic manner to the maneuver or energy controls of the aircraft. It can also provide recommendations for the activation of various ECM sub-systems, such as flare/chap dispersal, RDR mode selection, and the like. At step 10 the physical characteristics and maneuver-specific behavior of the objects (own aircraft, one or more friendly aircrafts, one or more adversary aircrafts) pertinent to the conduct of the close-in combat in the combat space are obtained by obtained onboard sensors 44 and by available remote sensors 46. The onboard sensors 44 could include any data available from the aircraft's system including the aircraft pitch, yaw and roll position, airspeed indicator, altimeter, range finding device, any infra-red search and track device, inertial sensors, GPS devices and the like. The remote sensors 46 primarily receive information from the DATA LINK system or like system. Such information provides all the available data concerning the combat space and the surrounding aircrafts including their position, type, speeds, altitude, pitch, yaw and roll position, acceleration or deceleration rates, ascent or decent rates and the like. Additional information can be received from devices, such as radar, IFF and the like, installed at a ground control center or an airborne command center. Information generated by the remote sensors 46 is transmitted to the assessment and guidance system 42. A computer program for the purpose of simulation may supply predetermined or adaptive information instead of information supplied by the sensors 46, and 44. Adaptive information is information provided in response to the pilot's actions. At step 12 the information supplied by the sensors 44 and 46 and the relevant data read from the assessment information database 48 are processed by the assessment and guidance application program 50 for the analysis of the current situation in the air combat space. Based on the results of the perceived situational analysis 12 at step 14 the assessment and guidance program 50 generates a predictive set of future potential combat situations. Note should be taken that the proposed system and method would provide the option of foregoing the generation of the predictive set of future potential combat situations. In this case the definition of the perceived situation would be used as a basis for obtaining an appropriately generalized well-know flight directive to be used as a generalized guidance to the pilot. A pre-defined, well-known set of such general directives would be stored on the storage device of the onboard computer for extraction and processing.

Still referring to FIG. 2 at step 16 the assessment and guidance program 50 evaluates the set of projected potential situations in order to assess a set of possible responses to the dynamically developing situation in the combat space. Alternatively the program control could proceed directly to step 18 to select a directive in accordance with the perceived situation analysis. At step 18 the assessment and guidance program 50 selects an optimal response or a suitable directive. At step 20 the selected optimal response or optimal directive is translated into a guidance indication or recommendations to be communicated to the pilot of the aircraft. The pilot utilizes the recommendations as guidance in the maneuvering of the aerial aircraft. The guidance indications could be transformed into direct commands to be applied the maneuver or energy controls of the aircraft. The visual, aural or verbal recommendations are mentally converted by the pilot to functional flight commands that are used as input to the maneuver or energy controls of the aircraft, such as the stick and throttle assemblies. The pilot is provided with the option of accepting or ignoring one or more of the recommendations. The input of the flight commands either in accordance with the received recommendations or following independent determinations by the pilot consequently activates the aerodynamic control surfaces and/or changes the engine output. As a result the appropriate maneuvering of the host aircraft will be achieved and the air combat situation will be progressively developed. The input commands will be further used as positive or negative feedback to the assessment and guidance system 42 as well as to the pilot. The steps 10 through 40 are iteratively performed in extremely short time intervals until the termination of the aerial engagement. The pilot may choose to engage an “automatic” system position whereby the recommendation is automatically performed by the aircraft’s automatic pilot system. Note should be taken that the sensor or communications or processor configuration or method is typically different for training flights and for “live” combat missions. For example, in typical training exercises the information concerning the adversary aircraft is pre-defined and therefore known to the tactical elements participating in the exercise. Thus, it can be processed or transmitted or received in a pre-defined and ready manner between the tactical participants within the combat in order to enable the aerial aircrafts or ground stations to share the information. In a “live” combat situation the adversary aircraft should be precisely located and identified by suitable on-board or off-board processing devices, the characteristics of the hostile aircraft should be suitably derived by the computing devices and the information should be appropriately and communicatively disseminated among the friendly tactical elements, such as the aerial vehicles, aerial control command aircrafts, ground stations and the like.

Figure 3:
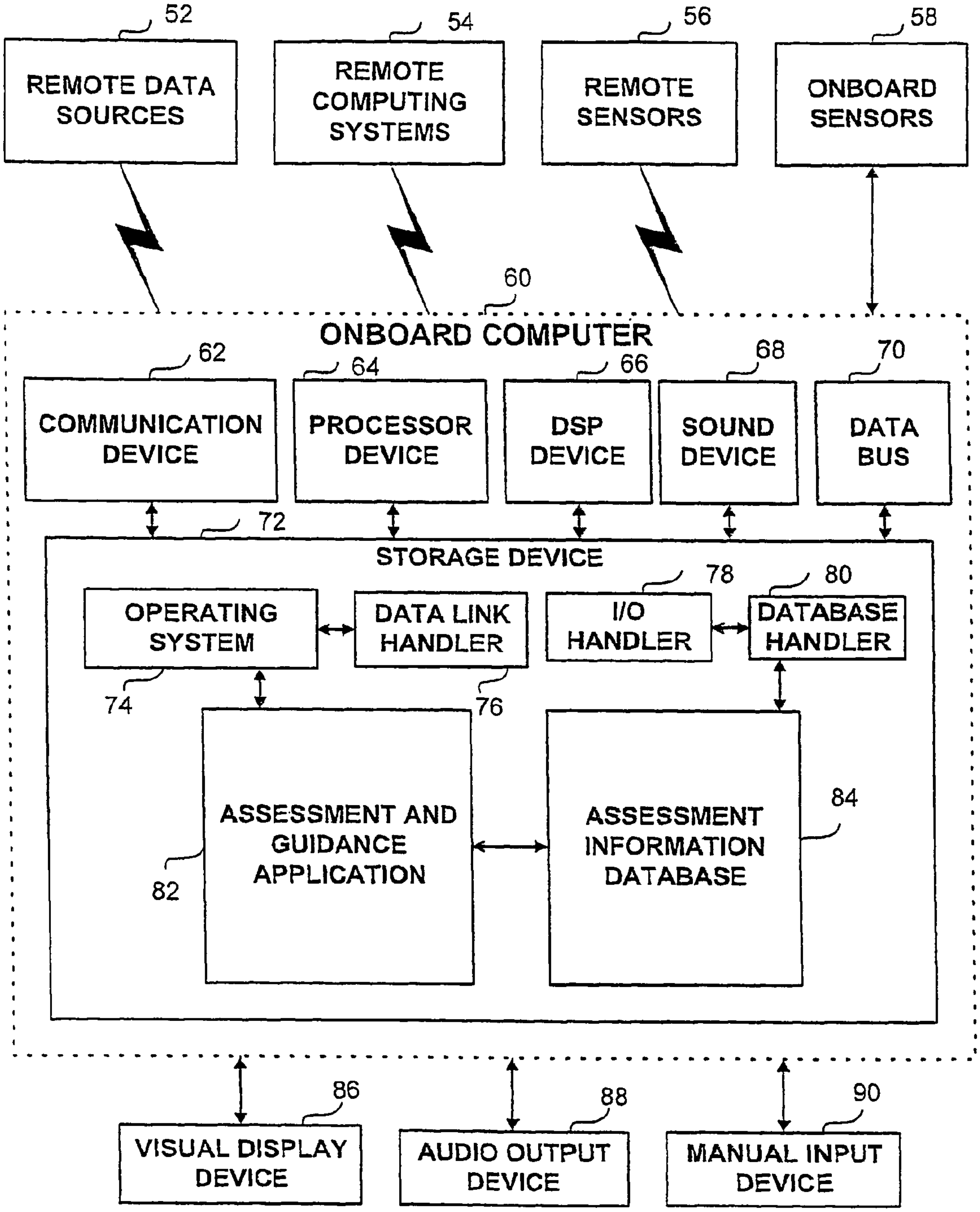
FIG. 3 is a block diagram describing the operative components of the proposed system, in accordance with a preferred embodiment of the present invention.

Referring now to FIG. 3 that shows the hardware and components constituting the airborne assessment and guidance system implemented on an aerial vehicle, such as a fighter aircraft. An onboard computing device 60 is linked to a set of onboard sensors 58. The computing device 60 is further communicatively connected to remote data sources 52, remote computing systems 54 and remote sensors 56 where the air combat-relevant information is transferred in a uni-directional or a bi-directional manner between the various aircrafts linked by a data communication network via suitable data links. The onboard computer 60 includes a communication device 62, such as a modem linked to a suitable transmitter/receiver device, such as a wireless device, a processor device 64, such as high speed microprocessor, a digital signal processing (DSP) device 66, such as an application-specific integrated circuit device for the processing of sensor data, a sound device 68, such as a sound-processing integrated circuit device, a digital data bus 70 to enable transfer of information between the various devices within the computing device 60 and a storage device 72, such as a high-capacity, high-speed hard disk. The storage device 72 includes a set of functional software programs and associated computer-readable data structures operative in the proper application of the system. The storage device 72 stores an operating system 74 for the overall control of the software program running in the device 60, a data link handler module 76 to initiate, to monitor and to control communications, an I/O handler module 78 to monitor, control and feed the relevant I/O devices, a database handler module 80 to access and to control the data bases, an assessment an guidance application 82 and an assessment database 84. The onboard computer 60 is linked to a visual graphics display device 86, such as a HUD, an HMS and the like, to an audio output device 88, such as the pilot headsets and to a manual input device 90, such as a suitable stick or throttle mounted (HOTAS) control or a weapon-control-panel-mounted sub-panel. In an alternative embodiment the onboard computer 60 can also be connected to a visual display such as a screen. In another alternative the onboard computer 60 may be connected to the automatic pilot system for providing direct instructions for continued flight.

Figure 4:
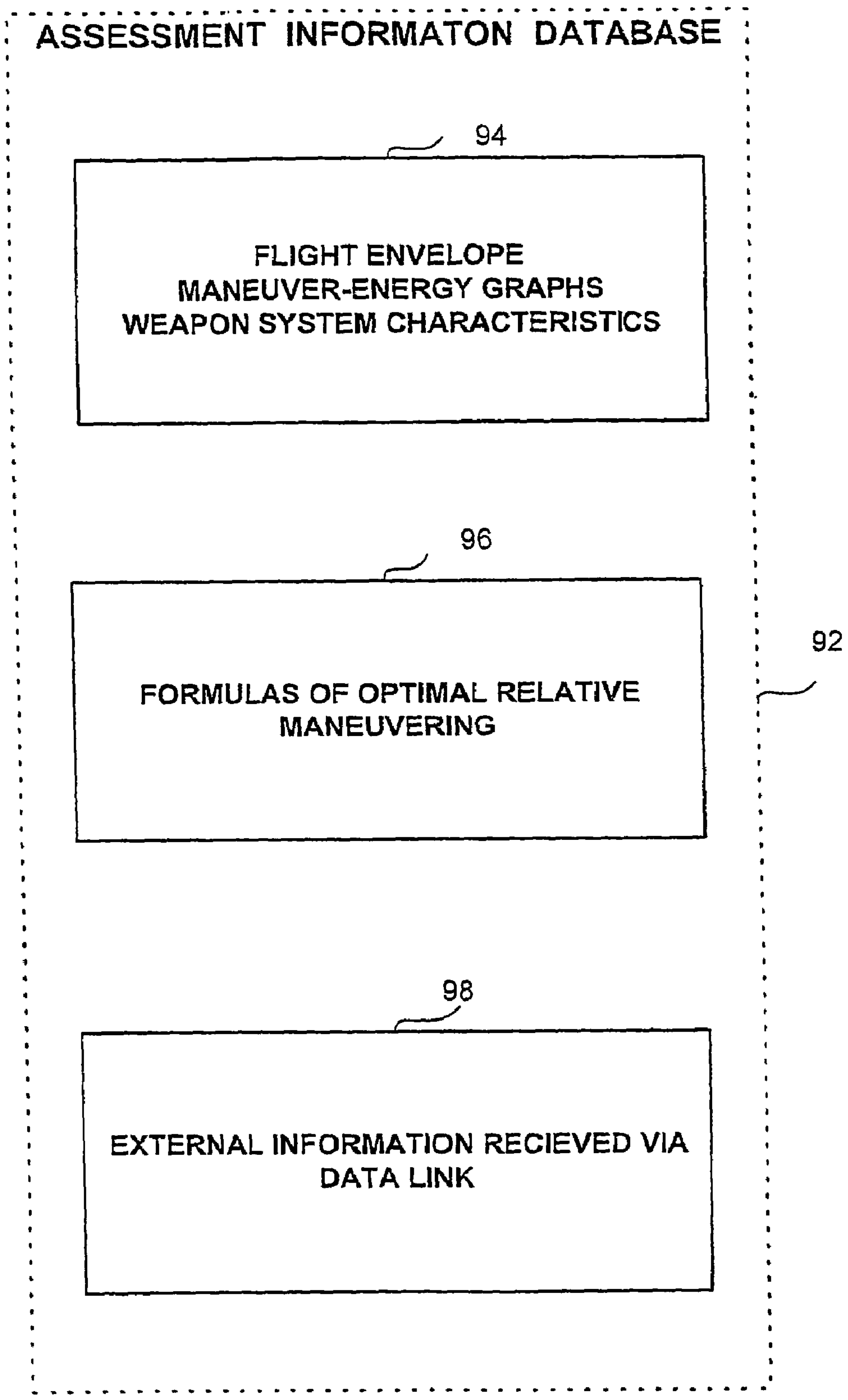
FIG. 4 is a block diagram describing the structure and constituent elements of the knowledge database, in accordance with a preferred embodiment of the present invention.

Referring now to FIG. 4 the assessment information database 92 is a set of information structures stored in a machine-readable format and organized in a suitable manner. The database 92 is implemented on the storage device 72 of the onboard computer 60. The database 92 includes the primary data files that support the operation of the assessment and guidance application software 82. The database 92 comprises an aircraft performance/weapon systems characteristics file 94, an optimal-relative-maneuvering formulas file 96, and an external information file 120. The assessment information in the files 94 and 96 is typically present within the database before the flight or may be optionally downloaded during flight to the assessment information database 92 via the data link or like communications system. The system and method of the present invention may use an off-aircraft database of information source, such as information made available by the data link system or like systems or information located on a database located on a database device located on the ground or on another aircraft. In addition, specific parts of the information may be located in various operating aircrafts and shared by the aircraft engaged in the combat space. The data within the external information file 98 is typically transmitted via the data link form various external data sources, such as specific ground stations, airborne command and control platforms, other friendly aircraft and the like.

The formulas of optimal relative maneuvering file 96 contain pre-defined, pre-generated data. The file 96 includes known algorithms representing specific and known physical/mathematical formulas operative in the generation of structured guidance to the preferred flight path between various different opponents, in particular to the vertical circles and fundamental definitions concerning the translation of the potential to the implementation of the sector. The file 96 could also include rules based on the analysis of previous dogfights between various aircrafts including cross-references to performance of the aircrafts, varying rates of turn, which may be provided to the pilot during training or in real time situations. Such information can include instructions as to performing aerial maneuvers, turns, turns with more than one center, reversal engagement, analysis of flight paths between aircrafts, means for obtaining angular advantage, means for obtaining a potential advantage (for example, through gaining speed or altitude) and the ability to convert potential into maneuvers. Such information may also include the best technique of flight to fully use the advantages of the aircraft the pilot is flying, and also the manner of operating the aircraft with a problem or when a problem is detected with an opponent’s aircraft. The aircraft characteristics file 94 contains pre-defined, pre-generated data based on the information supplied by the aircraft manufacturer. The file 94 includes information concerning the performance of the specific aircraft such as flight envelopes, maneuver-potential-energy graphs, weapon system characteristics and the like. The external information file 98 will include data received via the data link where the data concerns the current situation in the combat space. The external information file 98 is created and updated dynamically in the course of the close-in combat by data transmitted from external sensor devices associated with remote systems and/or remote processors. It would be easily understood that the organization, structure and functionality of the above-described database is exemplary only. In diverse preferred embodiments of the invention additional tables could be added, files could be eliminated or combined. For example an aircraft configuration file could be added as well as a training combat constraints table, a pilot's preferences table, and the like.

Figure 5:
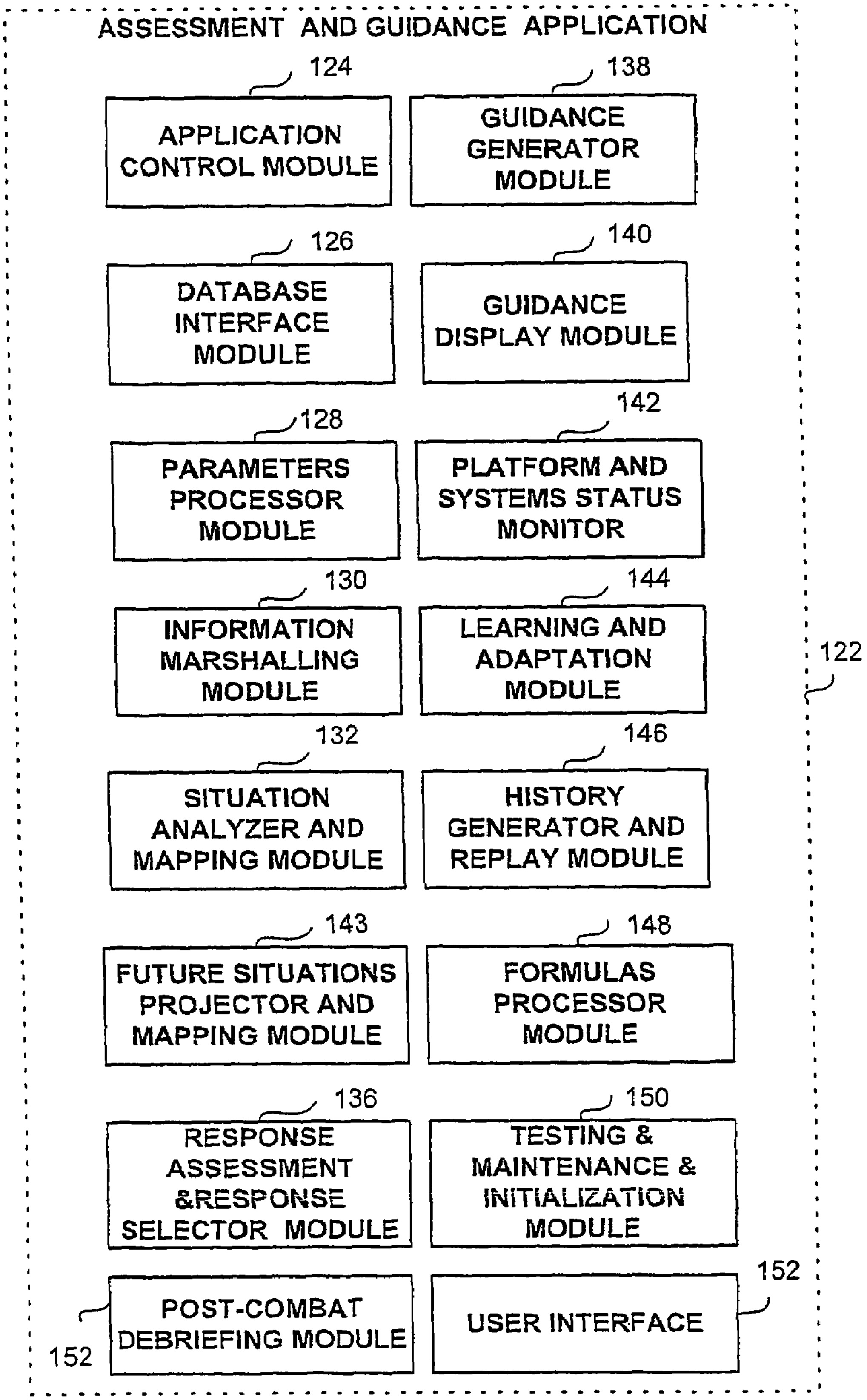
FIG. 5 is a block diagram illustrative of the software components of the application method in accordance with a preferred embodiment of the present invention.

FIG. 5 shows software components of the assessment and guidance application software, in accordance with a preferred embodiment of the present invention. The application 122 is operative to receive diverse information available concerning the situation in the combat space. In addition, the various other information contained in the database, including the aircraft characteristics file, the formulas file and the external information file are processed to recognize the possible solutions for the pilot to maneuver the aircraft to a position, which will attain an objective (such as gaining an advantage over an opponent while minimizing the risk by other opponents). The application 122 will then show the pilot the best available flight path, pitch, roll, yaw, speed and other information in order to bring about the aircraft to the suggested position. The process is continuous so that each change in the combat space and the aircraft itself enables a recalculation of the best position and solution to be offered and viewed to the pilot. In an alternative embodiment the application 122 provides the output suggestion course of action as instructions to the aircraft's automatic pilot system.

Application 122 is a set of program modules comprising encoded software or hardware instructions that are operative in the execution of the proposed method. Application 122 may include an application control module 124, a database interface module 126, a parameters processor module 128, an information marshalling module 130, a situation analyzer and mapping module 132, a future situations projector and mapping module 143, a response assessment and response selector module 136, a post-combat real-time debriefing module 152, a guidance generator module 138, a guidance display module 140, a aircraft and systems status monitoring module 142, a learning and adaptation module 144, a history builder and replay module 146, a formulas processor 148, a testing, maintenance and initialization module 150 and user interface module 152.

Still referring to FIG. 5 application control module 124 is responsible for the control of the assessment and guidance application 122. The module 124 initializes and activates the application 122, loads and activates the suitable modules, calls system-level modules, error-handling routines, communicates with users (pilot, maintenance) and the like. The database interface module 126 is called and activated by the control module 124 and is responsible for communicating with the system-level database handler 80 of FIG. 3. The module 126 accepts requests for database records, forwards the requests to the system-level database handler 80, accepts the requested records and sends the records back to the control module 124. The parameters processor module 128 is responsible for handling the functional parameters of the system, such as sampling rate and the like. The information marshalling routine 130 organizes the diverse information from the knowledge database, onboard and remote sensors and control files. The situation analyzer and mapping module 132 integrates the received information, performs the suitable analysis and comparison and creates a mapping of the current situation. The future situations projector and mapping module 143 creates a set of potential future situation maps in a predictive manner when the prediction is based on one or more maps of current situations. The response assessment and response selector module 136 evaluates the probability of the actualization of the future situations, derives appropriate conclusions and selects an optimal response. The guidance generator module 138 converts the selected response into guidance directions. The guidance display module 14 transforms the guidance directions into a displayable format and communicates the transformed directions to the pilot via specific display devices. The history generator and replay module 146 creates air combat-specific records indicative of the situations, projected situations and recommended maneuvers during combat and enables successive replay of the records on a suitable display media in order to provide for post-combat analysis. The debriefing module 152 provides the option of extracting the combat history records and the storage of the records on an external media to be used for later analysis. The aircraft and systems status monitor 142 monitors in real-time the status of the system and relevant aircraft components to provide the assessment and guidance application 122 with corrective parameters that are functional in modifying the operation of the system 122. The formulas processor module 148 is responsible for the selection and execution of the appropriate algorithms representing specific physical/mathematical formulas participating in the integration, and processing of the combat-specific data, such as close-in combat situation information, aircraft characteristics data, weapon systems data, sensory data and the like. The user interface module 152 is responsible for bi-directional communication with the aircrew, such as the pilot and/or the maintenance crew. The testing, maintenance and initialization module 150 enables the performance of system testing, parameter updates, database updates, routines upgrades, malfunction indications and the like. The learning and adaptation module 144 provides the option of modifying the operation of the system in accordance with the pilot-specific performance data collected in the history file. It would be easily understood that the organization, structure and functionality of the above-described application is exemplary only. In diverse preferred embodiments of the invention additional modules could be added, some modules could be dropped while others could be combined.

Figure 6:
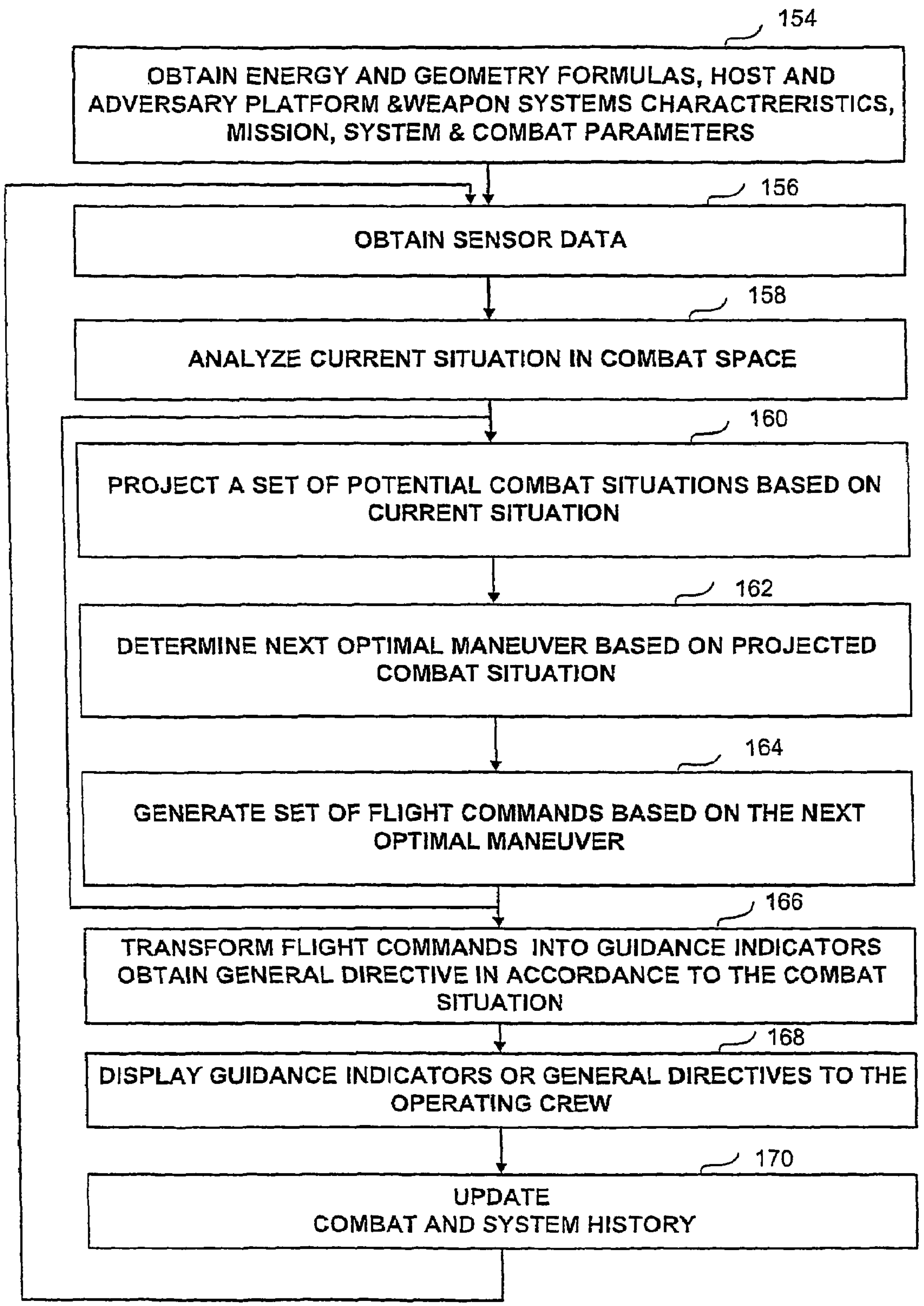
FIG. 6 is high-level flowchart describing the logic flow of the method, in accordance with a preferred embodiment of the present invention.

Referring now to FIG. 6 at step 154 the previously acquired assessment information stored in the assessment information database 92 of FIG. 4 is obtained. Information is further obtained directly from ground stations or other aerial stations such as other aircraft's computerized systems via the Data Link or like systems. At step 156 the data collected by the onboard sensors and the remote sensors is obtained. Data is further obtained directly from other sources such as the Data Link or like systems or ground systems or other aircraft systems. At step 158 the current situation in the combat space is analyzed and mapped into a real time sensory data structure (not shown). At step 160 the future situations projector and mapping module 143 utilizes the close-in combat information, the aircraft characteristics information, the aircraft's weapon system information, and real time sensory data 104 to create in a predictive manner one or more alternative future situation records within a combat history structure (not shown). At step 162 the alternative future situation records are evaluated in order to determine the next optimal maneuver for the host aircraft. For example, the application 122 will disregard physiological effects on the crew when such are cannot be weighed in. At step 164 the optimal maneuver determined at step 162 is transformed into one or more functional flight commands. In certain cases, when the best maneuver cannot provide an advantage, the system of the present invention may seek the best maneuver, which will not further deteriorate the position in which the aircraft is positioned.

In another embodiment if the system identifies harm may caused to the aircraft due to an unfavorable position (slow speed, potential collusion), the system may recommend disengaging the opponent's aircraft or taking other measures, such as guiding a suitable flight path. At step 166 the functional flight commands are converted into guidance indicators and at step 168 the guidance indicators are communicated to the operating crew. The guidance indicators are communicated to the crew such as to enable "head-up-out-of-the-cockpit" flight. The guidance indictors could be displayed on suitable visual devices such as HUD, HMS, and the like or could be communicated to the pilot vocally, aurally or verbally via suitable sound devices. The visual cues could involve diverse graphical symbology, such as guidance grids, dynamic-length directional bars, variably located circles and the like. The indicator symbols could represent various operative requirements, such as continuing aligning the aircraft's nose to x/y axles, specific location, G-force requirement, precise inversion guidance and the like. Alternatively, the guidance instructions may be transferred to the automatic pilot system. In cases where the application 122 is located on the ground or on another aircraft, the instructions may be provided to a communications device for sending the information to the appropriate aircraft systems, thus, the system of the present invention may be accomplished in association with aircrafts not having the application 122 or where such system has been damaged during operation. At step 170 the combat history structure is suitably updated and the program control returns to step 156 in order to obtain upgraded sensory data from the sensor devices.

Still referring to FIG. 6 where the complete and timely execution of the required calculations (sufficiently in advance on the axis of time to the required maneuvers) is not realistic due to, for example, practical limitations concerning available computing power (complexity of calculations versus processor speed constrains, data storage constrains, and the like), the set of successive guidance indicators would be replaced by at least one specific directives that are appropriate to the identified combat situation. Thus, consequent to the analysis of the current situation in combat space (step 15) the program control bypass the processing steps 160, 162 and 164 and would proceed directly to step 166. At step 166 a general directive is obtained from the stored set of well-know directives corresponding to the identified combat situation. Subsequently at step 168 the general directive would be displayed to the operating crew.

The system suitably notifies the pilot upon achieving a lethal weapon range envelope for all available weapons carried by the aircraft and recommends the preferred type of weapon system to be used as a result of the analysis of the locations of the participants in the combat space in regard to each other. The system further enables the pilot to select a specific weapon system independently of the recommendation. Following suitable identification of the adversary aircraft and weapon system status the system will also recommend the pilot the activation of one or more counter measures and counter measure parameters, such as type, quantity, and duration. The pilot is provided with the option of following or ignoring the recommendation. The system shows the solution for the entry into the maneuver leading to the appropriate position in accordance with the weapon or aircraft envelope used. This enables the use of various weapon or aircraft envelopes to be used by other aircrafts. Thus, for example, according to the present invention the system may "consider" a particular plane to have another plane's envelope and likewise weapons. This feature can be mainly used in training of pilots.

In addition to the continuously and dynamically changing successive directions it is assumed that in specific circumstances the pilot will be forced to act in such a rapid and determined manner that the stream of directions produced by the system may not be able to provide sufficiently rapid and accurate performance along the time axis or in relation to the relative positioning of the participating aircraft. Under these circumstances a standard general direction will be communicated to the pilot. The standard instruction is operative in the instruction of the pilot to perform specific known maneuvers in a determined manner. For example: the instruction "Perform gun offensive" concerns the performance of tracking the adversary aircraft by the gun sight. In this case a precision of 1 to 4 mill radians is required which will be probably lower than the precision provided by following the direction of the of the guidance system. Another example concerns the display of the standard instruction "Gun defensive" that will affect the performance of a tactical maneuver the objective of which is the location translation of an aircraft from a position in the forward quarter of an adversary to a position in the rear quarter of the same. In this tactical maneuver intense high-rate maneuvering is required including the dynamic manipulation of throttle and the air brakes. It is assumed that the guidance system may not be fast enough to display the respective directions in a timely manner.

The proposed system and method provides support primarily for one-on-one engagements (1v1), but it is also relevant for multi-aircraft engagements (MvN) as well. Appropriate support is further provided for accurate defensive maneuvers, such as scissor roll sequence, defense beam of 90 degrees against RF/Doppler radar and the like, against radar sites/advanced ground-to-air missiles, and the like. The system will notify the pilot concerning entry into the aerodynamic and radiometric envelope of heat-seeking missiles and will provide recommendations concerning the manner of defense.

Different modalities of "live" combat or training exercises will enable learning, access exercises, emphasis on different parameters, such as energy/potential fight, angles fight, inversion, circle disengagement consideration as a result of fuel load status and the like. The practiced weapon envelope and the energy regime (idle or military power) will be significant parameters in the preferred course of the combat. During operational air combat as well during training exercises various "command decisions" (the need for short duration and minimum allowed speed combat as a result of potential ground threats) could be combined and integrated into the system.

The rules of air combat are based on the analysis of the maneuvers performed by the aircraft in three dimensions (six degrees of freedom), the interrelationships between the aircraft and the understanding of the energy potential and the turn rate in diverse variable geometrical planes. The knowledge is principally physical and is provided to the pilot in an instruction framework including ground-based and in-flight instruction sessions. The responsibility of the pilot is to implement the theoretical knowledge during close-in combat. For example: instructions to operate in the principal modalities of the combat, such as loop, barrel roll, split S, maneuvering in concentric circles, in one-directional circles, scissors, analysis of flight paths among the aircraft, ways and means to achieve angular advantage, ways and means to achieve energy advantage (altitude, speed), the possibility of converting potential advantage to angular advantage, the optimal techniques for the utilization of the advantages of the aircraft in respect to an adversary aircraft, the manner of conducting air combat that emphasizes the attainment of potential energy advantage and the conversion thereof into angular advantage, the method of conducting air combat that emphasizes how to attain angular advantage only, the method of conducting combat when at disadvantage, the method of conducting combat when at advantage and diverse methods for reaching the lethal weapon envelope as a final conclusion of the methods for conducting air combat in various modalities. The knowledge is integrated into application software as suitable algorithms and utilized in association with additional available real time information to support the analysis of the required actions.

The existing internal software systems in the aircraft collect relevant information concerning physical magnitudes associated with the aircraft. The information is transmitted across data communication networks. The proposed system will define the sampling parameters and the collection of relevant data to be used in association with the software. The information will flow in the communication network and added or integrated in the database to enable the analysis of the moves performed in the combat. Examples of the data: accurate location of the aircraft participating in the combat, altitudes, speeds, comparative planar and circular relationships between the aircraft performing "live" combat or training in the combat space. The physical data transferred within the network have a significantly higher accuracy than the estimations of pilot thus such information could be used as a substantially reliable basis for the operation of the assessment and guidance program.

The system and method of the present invention may operate according to predetermined rules providing a recommended action when the rule is met. For example, a rule may provide that when an aircraft with a limited rate of turn and high-energy characteristics is engaged against an aircraft with a better rate of turn, the aircraft having limited turn capability will adopt a vertical/high sped tactic. Alternatively, the system and method of the present invention may provide that a specific situation is to be solved in a particular manner. For example, the system will indicate the desired direction, speed, rate of ascent or decent to engage in the shortest route an enemy aircraft. Yet, in another alternative the system may calculate a number of scenarios at the same time and provide the best solution in accordance with predetermined preset positions. For example, if a few enemy aircrafts are in flight the system may provide the course and other indications to intercept and engage the closest aircraft or the aircraft against which the best position may be attained and the lower chances to be hit according to a predefined combat plan or in accordance with the positions and situations of other friendly aircraft or in accordance with instructions from a command center.

It is important to note that program operates in such a manner as to ignore psychological factors and personal characteristics of the pilot. The program enables for an aerial aircraft having inferior flight characteristics to delay (temporarily) the deterioration of the combat situation in an optimal manner (e.g. while unable to provide better energy or maneuvering capabilities the system and method could provide for the optimal defensive maneuvering and the best possible energy usage within the available time window). Where it is recognized that there is no way to achieve the fundamental objectives of the aircraft within the available time limits, the remaining fuel load, the ordnance availability the program recommends the initiation and performance of a disengagement maneuver in an optimal manner. A pilot conducting a training combat is provided with the capability of controlling the operative parameters of the combat such as combat modality, combat with/without disengagement, restricting the conduct of the combat to a specific potential or to a specific attack sector. The defined weapon system configuration for training or the actually carried weapon system for operational missions is vital for the analysis, assessment and guidance of the system for the preferred conduct of the combat. The proposed system could be implemented immediately for air combat training due to the maturity of DATA LINK systems installed in the aircraft. The integration of the system into operational air combat is contingent upon the implementation of accurate positioning of the adversary aircraft, the accurate identification thereof in order to identify the energy/maneuvering capabilities of the aircrafts as well as the associated weapon systems, and real time accurate tracking to provide the airspeed and possibly the IR signature.

The introduction of this information into a computed-based analysis and calculations routines will effect the substituting of human analysis as it is done currently concerning the capability of the aircraft for offensive moves or defensive moves provides the option of finding an optimal physical or mathematical, or computing algorithm solution, or a set of known rolls implemented in the software in each and every given point in time during the air combat to the optimal maneuvering solution, which is derived by the system or program in consideration of the objectives of the air combat.

One of the products of the processing software is derived directions or instructions. The flight directions are displayed for the pilot as continuous and dynamically changing recommendations, optionally on the flight director. Primarily this guidance concerns nose attitude and power (engine Vs drag—S.B./flaps and the like). A direction, recommendation or a guidance indication is a summarized expression comprising a plurality of complex commands. For example the needed magnitude of the force for the activation of the stick in the turn plane or roll plane, the rate of roll and turn, the airspeed, the altitude, the AOA, the preferred G-forces, the opening and retarding of the throttle (including various operational engine positions from idle through military to full power (after-burner), and the like. In the preferred embodiment a simple indication to the pilot is provided so as to enable the pilot to understand that indication made with as little effort invested as possible.

In the future additional options such as virtual displays, holographic displays, and the like, enlarged Head-up-Displays, helmet mounted monocular, biocular or binocular lenses into which pictures and the "flight thread" are superimposed, miniature flat screens and the like. Horizontal deviations of the flight thread from the circle will require the performance of the command to roll to the opposite side. Vertical deviations of the thread will accordingly necessitate the escalation of the diminishing of a pitch maneuver resulting in the changing of angle-of-attack, G-force, turn rate and airspeed. Verbal announcement system utilizing synthesized speech such as the replaying of the sentence "Gun Offensive", "Perform firing of the gun" and the like. In addition, other tactical comments may be made, such as "release chaff", "activate electronic measures", "radar lock" and the like. A non-verbal sound system supplying sounds indicative of the required maneuvers is supported as well. Optionally a funnel like display may be employed to direct the pilot to the best or suggested course, altitude, attitude and speed. As previously noted the same indications may be directed towards the aircraft's flight director or automatic pilot systems.

The handling of the aircraft in accordance with the guidance directions provided by the system and method will significantly reduce the effect of emotional overload and time sharing inefficiency that decreases the efficiency of the pilot and consequently of the flight performance. As a result a significantly more precise and more effective maneuvering will be achieved The proposed system and method provides the option of controlling directly manned and unmanned aircrafts and their associated weapon systems. When directly controlling the aircraft the guidance directions are converted to functional flight commands by the system and applied directly to the physical flight control systems of the aircraft. In order to implement direct control a suitable integration of the analysis and calculation functions with the physical control system of the aircraft will be necessary.

The assessment and analyzing system could be alternatively installed off-board only, such as on a remote ground-based or airborne command and control centers. The information produced in such a remote manner could be transmitted to the pilot of the aircraft participating in a close-in combat in the combat space via suitable high-speed high-bandwidth data links.

The dynamic guidance involves the generation of a sequence of successive recommendations to the pilot in regard to the handling of the aircraft participating in an air combat exercise, or in a "live" air combat. The proposed system and method are applicable to and could be implemented on manned aircraft, unmanned aircraft, virtual aircraft simulated in flight simulator devices and/or implemented in diverse computer gaming applications installed on computer aircrafts, such as personal computers (PCs), mainframes, dedicated computing aircrafts and the like. The implementation of the application during a training exercise is contingent upon the maturity of real time high-speed, high-capacity communication methods between the participating aircraft and upon high speed high-volume data processing capabilities. The implementation of the application on aircraft for a "live" air combat is further contingent on onboard and/or remote capabilities providing for the accurate location and identification of hostile aircraft.

In addition, a central component of the system is the ability of more then one system to operate simultaneously in a network of aircrafts, which may include ground control and command centers. In such an environment the system of each aircraft will communicate with other friendly aircrafts to coordinate the battle space and efficiently allocate the resources available to the air command in waging a dog fight including several other enemy aircrafts or targets and effectively completing designated missions. Aircraft to aircraft communications may be accomplished directly as peer-to-peer communications or via a ground control center. Alternatively one aircraft may relay, directly or indirectly orders or messages to other aircrafts thus achieving an efficient deployment of the system's range. In addition, in accordance with this embodiment participants may obtain information required about fellow aircrafts including presentation on the HUD with relevant information such as designation, speed, altitude and the like. Ground control centers or command centers may have additional computers with sufficient processing power to enable a truly real-time analysis of all the variables noted above in order to provide the various aircrafts in the battle space with additional guidance or orders. The dynamic guidance of pilots engaged in air-to-air combat would greatly enhance the pilot's ability to manage threats in the battle space and effectively engage other aircrafts. In addition, the system and method of the present invention will greatly reduce the costs of training a pilot. The system and method of the present invention may be implemented in any computer It will be appreciated by persons skilled in the art that the present invention is not limited to what has been particularly shown and described hereinabove. Rather the scope of the present invention is defined only by the claims, which follow.

I claim:

1. A system for optimizing a performance of an operating crew of at least one aerial vehicle during at least one close-in air combat the system comprising:

an assessment information database implemented on at least one computer; and an assessment and guidance software application implemented on the at least one computer for providing in real-time automatic situation assessment, generating dynamically at least one indication related to the at least one close-in air combat and communicating the at least one indication guidance to the operating crew of the at least one aerial vehicle, wherein said automatic situation assessment relates to a situation of a dog fight air combat between two aircraft vehicles.

2. The system as claimed in claim 1 wherein the assessment information database comprises:

an aircraft characteristics file comprising an aircraft flight envelope, aircraft maneuver-energy graphs, models and limitations, and aircraft weapon system characteristics;

a set of formulas for an optimal relative maneuvering file; and an external information file.

3. The system as claimed in claim 1 further comprises at least one computer installed on the at least one aerial vehicle or on at least one ground station to receive, store, process and forward data specific for optimization of a conduct of an at least one aerial engagement.

4. The system of claim 3 wherein the at least one computer is an onboard computer located within the at least one aerial vehicle.

5. The system as claimed in claim 1 further comprising at least one off-board computer installed in at least one pound station to provide additional data specific for optimization of a conduct of the at least one close-in air combat.

6. The system as claimed in claim 1 further comprising at least one sensor device installed on the at least one aerial vehicle to dynamically monitor physical variables associated with aircraft vehicles participating in the at least one close-in air combat.

7. The system as claimed in claim 1 further comprising at least one sensor device installed in an at least one ground station to monitor physical variables associated with aircraft vehicles participating in the at least one close-in air combat.

8. The system as claimed in claim 1 further comprising at least one data communication network linking the at least one aerial vehicle and an at least one ground station to allow for transmission or reception of information associated with the at least one close-in air combat.

9. The system as claimed in claim 1 wherein the assessment and guidance software application comprises:

an application control module to initiate, to activate, to control and to execute the assessment and guidance software application;

a database interface module to allow for access the assessment information database and to obtain records from the assessment information database;

a parameters processor module to handle operational parameters of the aircraft vehicle;

a situation analyzer and mapping module to analyze at least one situation concerning the at least one close-in air combat; and a response assessment and response selector module to generate or select at least one response associated with an at least one current situation and an at least one potential situation.

10. The system as claimed in claim 9 wherein the assessment and guidance software application further comprises:

a future situations projector and mapping module to create at least one potential future situation and associating the at least one potential future situation with the at least one current situation;

a guidance generator module to convert at least one selected response to at least one guidance instruction;

a guidance display module to communicate at least one guidance instruction to the operating crew;

an aircraft status and system status monitor;

a learning and adaptation module;

a history generator and history replay module;

a set of rules module or algorithm;

a testing/maintenance/initialization module; and a user interface module.

11. The system as claimed in claim 9 wherein the assessment and guidance software application further comprises any one of the elements of:

an operating system to supervise and control execution of programs installed in the at least one computer;

a data link handler component to initiate transmission of outgoing information and to receive incoming information from an at least one data communication network;

an input/output handler component to supervise and control peripheral devices linked to the at least one computer;

a database handler component to initiate access to the assessment information database.

12. The system as claimed in claim 1 wherein the at least one computer further comprises the elements of:

a communication device to link the at least one computer to remote information sources via an at least one data communication network;

a processor device to execute a sequence of software instructions embedded in the assessment and guidance software application;

digital signal processor device to process digitally formatted information from an at least one sensor device and from an at least one data communication network; and a data bus device to provide at least one data delivery channel among devices installed in an at least one onboard device.

13. The system of claim 12 further comprising a sound synthesizing device to generate audio instructions to be communicated to the operating crew of the least one aerial vehicle.

14. The system as claimed in claim 13 wherein the sensor device is an instrument providing an indication as to parameters of flight.

15. The system as claimed in claim 13 wherein the sensor device is a global positioning system device.

16. The system as claimed in claim 1 wherein the at least one aerial vehicle is an unmanned combat aerial vehicle.

17. The system as claimed in claim 1 wherein the operating crew is a remotely located operator.

18. The system as claimed in claim 1 further comprises a visual display device to communicate an at least one instruction to the operating crew in a visual manner.

19. The system as claimed in claim 1 further comprises an audio output device to communicate an at least one instruction to the operating crew in an aerial manner.

20. The system as claimed in claim 1 further comprises a manual input device to communicate control information from the operating crew to the system.

21. The system as claimed in claim 1, further comprising an identifying element for identifying the aerial vehicle.

22. The system as claimed in claim 1, wherein the assessment and guidance software application provides accurate speed and direction guidance.

23. The system as claimed in claim 1, wherein the assessment and guidance software application provides guidance according to a flight path of an adversary aircraft.

24. The system as claimed in claim 1, wherein at least a portion of the situation assessment is a function of ammunition data.

25. A method for optimizing a performance of an operating crew of at least one aerial vehicle during at least one close-in air combat by providing in real-time automatic situation assessment data and by generating dynamically at least one instruction and by communicating the at least one instruction as guidance to the operating crew of the at least one aerial vehicle, the method comprising the steps of:

for each one of at least two aerial vehicles;

obtaining air combat engagement and energy information required for analysis of the air combat situation;

obtaining aircraft characteristics information required for the analysis of air combat situation;

obtaining aircraft weapon system characteristics information; and obtaining remotely sensor-specific information;

analyzing the situation between the at least two aerial vehicles and mapping the analyzed situation in relation to previously analyzed situations between the at least two aerial vehicles;

determining at least one optimal state of the at least one aerial vehicle based on the at least one optimal air combat situation between the at least two aerial vehicles;

generating at least one recommendation concerning a preferred maneuvering of the at least one aerial vehicle based on the analyzed situation between the at least two aerial vehicles, aircraft characteristics and aircraft weapon system characteristics information.

26. The method as claimed in claim 25 further comprises the steps of:

transforming the at least one recommendation into at least one guidance indicator;

displaying the at least one guidance indicator to the operating crew of the at least one aerial vehicle to enable an application of associated commands to the controls of the aerial vehicle.

27. The method as claimed in claim 25 further comprises transforming the at least one recommendation into at least one direct input commands to be automatically applied to suitable controls of the at least one-aerial vehicle.

28. An apparatus for optimizing the performance of an operating crew of at least one aerial vehicle during at least one close-in air combat by providing in real-time automatic situation assessment, the apparatus comprising:

a device for: obtaining air combat engagement and energy information required for analysis of the air combat situation;

obtaining aircraft characteristics information required for the analysis of the air combat situation;

obtaining aircraft weapon system characteristics information; and obtaining remotely sensor-specific information;

an analysis device for:

analyzing the situation between the at least two aerial vehicles and mapping the analyzed situation in relation to the previously analyzed situations between at least two aerial vehicles;

based on the analysis determine at least one optimal state of the at least one aerial vehicle based on the at least one optimal air combat situation between the at least two aerial vehicles; and generating at least one recommendation based on the at least one optimal future potential air combat situation between the at least two aerial vehicles.

29. The apparatus as claimed in claim 28 further comprises:

a transforming device for transforming at least one recommendation into at least one guidance indicator; a display device for displaying the at least one guidance indicator to the operating crew of the at least one aerial vehicle to enable the application of the associated commands to the controls of the aerial vehicle.

30. The apparatus as claimed in claim 28 further comprises a transforming device for transforming the at least one recommendation into at least one direct input commands to be automatically applied to suitable controls of the at least one aerial vehicle.

* * * * *